May 17, 1960
G. GIAMMARCO
2,937,071
METHOD OF REMOVING HYDROGEN SULPHIDE FROM
GASEOUS MIXTURES BY MEANS OF
ARSENICAL SOLUTIONS
Filed Oct. 6, 1958
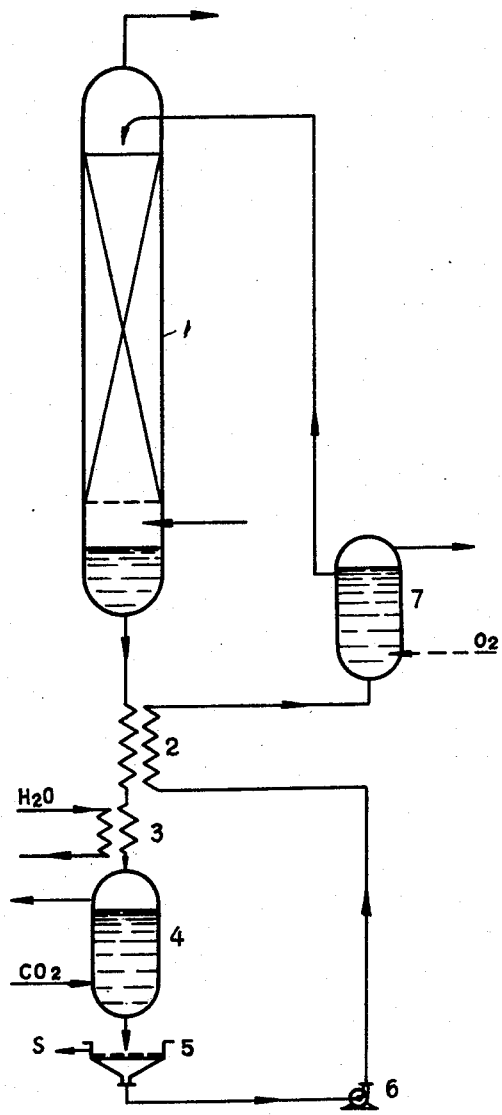
Inventor
Giuseppe Giammarco
by Stevens, Davis, Miller Mosher
his attorneys

United States Patent Office 2,937,071
Patented May 17, 1960

2,937,071

METHOD OF REMOVING HYDROGEN SULPHIDE FROM GASEOUS MIXTURES BY MEANS OF ARSENICAL SOLUTIONS

Giuseppe Giammarco, Porto Marghera, Venice, Italy, assignor to Vetrocoke S.p.A., Turin, Italy Application October 6, 1958, Serial No. 765,404

Claims priority, application Italy October 7, 1957

4 Claims. (Cl. 23—3)

This invention is an improvement of the method of eliminating hydrogen sulphide from gaseous mixtures disclosed by Italian patent specifications No. 560,161 and No, 565,320 and U.S. patent application Ser. No. 594,775, filed June 29, 1956.

According to the prior method hydrogen sulphide is fully removed alone or jointly with carbon dioxide, either at atmospheric or superatmospheric pressure, at room temperature or higher temperatures by scrubbing by means of solutions containing arsenite (a compound of tri-valent arsenic bound with oxygen), arsenate (a compound of penta-valent arsenic bound to oxygen) and monothioarsenate ($M_3AsO_3S$, a sulphuretted compound of pentavalent arsenic which is typical of the method and in which to one atom arsenic there corresponds one atom sulphur).

As is well-known the above mentioned method comprises an absorption step at which hydrogen sulphide is bound by arsenite to thereby form thioarsenite; a digestion step at which the thioarsenite is reacted with arsenate in a proportion of 3 moles arsenate at least to one mole thioarsenite in order to form monothioarsenate and arsenite; an acidifying step at which the solution containing monothioarsenate is subjected to a reduction in alkalinity, preferably through the action of carbon dioxide in order to convert monothioarsenate to arsenite separating elemental sulphur; and an oxidation step at which the arsenate consumed by digestion is re-established by oxidation of arsenite. The four abovementioned steps can be carried out separately or jointly in one or more apparatus.

It is moreover known that the oxidation step is mostly carried out by treating the abovementioned sulphuretted arsenical solution by means of oxygen or oxygen containing gases.

The object of this invention is to improve oxidation of the abovementioned solutions by means of oxygen or oxygen containing gases, thereby reducing the size of the apparatus employed for carrying out this oxidation step.

A further object of this invention is to improve the method when removing hydrogen sulphide from high temperature high pressure gases.

The improvement consists in carrying out oxidation of the abovementioned sulphuretted arsenical solution by treatment thereof by means of oxygen or oxygen containing gases at high temperature, preferably at a temperature exceeding the boiling point at atmospheric pressure of the solution, that is, by operating under pressure.

The use of high temperatures on oxidation by means of oxygen containing gases of alkaline solutions containing sulphuretted compounds has not been found convenient heretofore and has been avoided on account of the well known fact that a rise in temperature causes sulphur in the sulphuretted compounds to oxidise through secondary reactions by an extent increasing with the alkalinity of the solution, through combination with alkali, thereby forming for example a thiosulphate, and consuming alkali by a corresponding extent.

We have now discovered that this drawback is eliminated even when operating at very high temperatures such as those exceeding the boiling point at atmospheric pressure of the solution, if the sulphuretted arsenical solution containing monothioarsenate and arsenite also contains a free arsenate (that is, pentavalent arsenic in excess over the quantity required for forming monothioarsenate) and is of such high alkalinity that its pH equals 8 at least and preferably ranges between 9 and 11. Under such conditions during treatment of the solution by means of oxygen at any desired high temperature arsenite is converted to arsenate, whereas the sulphuretted compounds keep stable and no secondary sulphur oxidation reactions are ascertained. This behaviour of the sulphuretted compounds is due probably to the fact that the presence of free excess arsenate mentioned above prevents co-existence in addition to monothioarsenate of multi-sulphuretted compounds which do not possess the stability of monothioarsenate in respect of oxygen. The alkalinity of the solution (pH exceeding 8, preferably ranging between 9 and 11) furthers likewise stabilisation of monothioarsenate and is therefore in the specific case an essential condition to avoid secondary oxidation reactions of the sulphur in the sulphuretted compounds, contrarily to the general belief that an increase in alkalinity promotes secondary reactions.

In support of the above, the result of a number of experiments carried out on solutions containing arsenite, arsenate and monothioarsenate, such as the solutions used for absorbing hydrogen sulphide in accordance with the abovementioned prior method, are given hereafter.

A solution of the following analysis: alkalinity titratable by methylorange expressed as $K_2O=202.8$ g./l., arsenite expressed as $As_2O_3=125.4$ g./l., arsenate expressed as $As_2O_3=21.2$ g./l., monothioarsenate expressed as $S=5.5$ g./l., $pH=9.7$, was submitted to the oxidizing action of oxygen at temperatures variable between 50° C. and 175° C. during a constant period of time. In order to reach higher temperatures, operation was carried out at superatmospheric pressure. After each treatment the rise in arsenate concentration as well as the quantity of sulphur oxidised through secondary reactions were ascertained. The results are given hereafter:

| Temperature, ° C. | Arsenate formed, g./l. $As_2O_3$ | Oxidised S, g./l. S | Pressure, atm. gage |
|---|---|---|---|
| 50 | 5.0 | 0.05 | 6 |
| 70 | 11.7 | 0.05 | 6 |
| 93 | 18.3 | 0.05 | 6 |
| 105 | 25.4 | 0.09 | 6 |
| 120 | 37.1 | 0.23 | 6 |
| 140 | 41.0 | 0.23 | 6 |
| 160 | 60.4 | 0.27 | 7 |
| 175 | 106.0 | 0.53 | 12 |

The above results disclose that secondary oxidation reactions of the sulphur in the sulphuretted compounds are practically negligible, the action of oxygen leading chiefly to oxidation of arsenite to arsenate, which strongly increases with the rise in temperature, the increase in rate being exponential, whereby this improvement affords a high increase in oxidation rate, accordingly reducing the apparatus in size and avoiding objectionable secondary reactions. Solutions richer in monothioarsenate, but still containing excess arsenate were likewise found to be exempt of objectionable secondary reactions. It was even ascertained that the rate of oxidation of arsenite considerably increases through the presence of the sulphuretted compound. So, a solution as disclosed above, but containing monothioarsenate expressed as S in a proportion of 26.8 g./l. instead of 5.5. g./l., treated at a temperature of 130° C. at a pressure of 6 atm. by means of oxygen showed in a period of time four times less the formation of 40 g./l. arsenate, 0.6 g./l. sulphur only having been oxidised at the same time.

The behaviour of the sulphuretted compounds during treatment of the solution by means of either oxygen or air is satisfactory even when the said treatment is carried out for a longer period of time. So it was found that with a solution of the following analysis: alkalinity titratable by methylorange expressed as $K_2O=136.3$ g./l., arsenite expressed as $As_2O_3=81.6$ g./l., arsenate expressed as $As_2O_3=20.1$ g./l., monothio-arsenate expressed as $S=3.5$ g./l., treated by means of oxygen at a temperature of 165° C. and a pressure of 10 atm. gage, after half an hour arsenate expressed as $As_2O_3$ rose to 48.8 g./l., oxidsed S was 0.68 g./l. After an hour the results were 65.1 g./l. and 0.83 g./l. respectively, after ninety minutes 76.9 g./l. and 0.9 g./l., respectively.

Use of air instead of oxygen practically leads to the same results, which discloses that the rate of oxidation of arsenite chiefly depends upon temperature and not upon oxygen concentration.

It was moreover found that a further increment in oxidation rate of sulphuretted arsenical solution and corresponding reduction in size of the apparatus for the oxidation step is obtainable by the use of catalysts. A large number of substances are known in the art and industrial practice through their property of acting as oxygen carriers thereby facilitating passage of oxygen through a chain of intermediate reactions from a gaseous to a liquid phase at which it is bound. According to this improvement the catalyst should be selected to fulfill the above condition, that is as arsenite is oxidised to arsenate, oxygen should not be bound by the sulphur in the sulphuretted compound through secondary reactions. This condition is met by polyvalent phenols currently employed as oxygen carriers which give rise to reversible oxidation-reduction systems, such as hydroquinone, pyrocatechin, pyrogallol, oxyhydroquinone, their sulphonic derivatives such as hydroquinone-sulphonic acid, halogenated derivatives such as chlorohydroquinone, bromohydroquinone, oxidation products such as parabenzoquinone, orthobenzoquinone, etc. These substances showed a tendency not only to not promote secondary sulphur oxidation reactions, but even to decrease them probably through a preferential action in respect of arsenite. However, this characteristic action is still bound to the presence of free arsenate in the solution, failing which, as is well known from industrial practice and the method known by the name "Perox" the said substances give rise to secondary sulphur oxidation reactions. The catalytic action of the above catalysts is illustrated by the following example in which with a solution of the abovementioned type containing 202.8 g./l. $K_2O$, 125.4 g./l. arsenite, 21.2 g./l. arsenate and 5.5 g./l. monothioarsenate in the presence of 0.1 g./l. hydroquinone, treated during the same period of time in the same apparatus and under the same conditions by means of oxygen, showed 72 g./l. arsenite being oxidised at 135° C., this being about twice with respect to the absence of hydroquinone, the quantity of oxidised sulphur keeping practically the same.

This improvement is useful and has been advantageously used in all desulphuration processes utilising the method according to the abovementioned prior patents. For instance it was found advantageous, even when absorption is carried out at room temperature, to carry out the oxidation step at elevated temperature while employing a solution of the kind defined above, namely containing arsenite, free arsenate and monothioarsenate, its pH value exceeding 8. The reduction in size of the oxidation apparatus is all the greater as the temperature adopted is higher, as results from the preceding table.

A particularly advantageous instance in which this improvement was used is when carrying out the absorption step likewise at high temperature. This is very frequent in practice in connection with the production of gaseous mixtures by gasification and partial combustion of hydrocarbons at high temperature by means of pressure oxygen, when the gaseous mixtures obtained are generally available at temperatures exceeding 150° C., so that the oxidation step can likewise be carried out in a particularly advantageous manner at the same temperature.

The use of the improved method in such instance is illustrated by the accompanying drawing.

In an absorption tower 1 a hot gas from gasification of hydrocarbons by means of pressure oxygen, the said gas being mostly at a pressure of 20–30 atm. and having an $H_2S$ content of about 0.5–1% is purified from its $H_2S$ content at an operational temperature of 150–180° C. by scrubbing by means of the absorbing solution typical of the prior method, namely containing arsenite, arsenate even in excess, and monothioarsenate, its pH value ranging between 9 and 10. The $H_2S$ is practically fully removed, the high temperature during absorption resulting moreover in a thorough digestion reaction. The solution issuing from the tower 1 is cooled in a heat exchanger 2 and water cooler 3 preferably to about 50° C. and is admitted into an autoclave 4 in which the acidifying step is carried out by the acidifying action of compressed carbon dioxide so that monothioarsenate is decomposed to arsenite separating sulphur in elemental condition. On issue from the autoclave 4, upon filtering sulphur in 5, the solution is taken by the pump 6, heated in 2 to a temperature near its absorption temperature and admitted into the oxidising container 7 in which it is treated by means of oxygen. Oxygen is conveniently a part of that produced and utilised under the same pressure for gasifying the hydrocarbons. On oxidation the consumed arsenate is re-established, no appreciable oxidation of sulphur being ascertained. The resulting regenerated and oxidized solution is finally returned to the absorption tower.

Beyond consuming oxygen, the process practically consumes no heat but for the extent represented by imperfect heat exchange at 2.

The abovementioned embodiment should not be considered to limit the use of this improvement. As a matter of fact, the high temperature oxidizing step described above could be carried out at any other location in the plant.

For instance, in order to take advantage of the high temperature at which the solution issues from the absorption tower 1, the oxidizing step can be carried out direct after the absorption step, before the cooling and acidifying step, or it can be carried out in parallel with the absorption, part of the solution being continuously recirculated between the absorption tower and oxidizing container.

What I claim is:

1. In the method of removing hydrogen sulphide from a gaseous mixture by means of a scrubbing solution containing an arsenite, arsenate and monothiarsenate, comprising an absorption step at which hydrogen sulphide is bound by the arsenite to form thioarsenite, a digestion step at which the thioarsenite is reacted with the arsenate to form arsenite and monothioarsenate, an acidifying step at which the solution containing monothioarsenate is subjected to a reduction in alkalinity thereby to decompose the monothioarsenate into arsenite and elemental sulphur, and an oxidizing step at which the solution is oxidized to convert the arsenite to arsenate thereby re-establishing the arsenate consumed in the digestion step, the improvement consisting in maintaining in the oxidizing step a free arsenate content in the solution, and effecting the oxidizing step by means of an oxygen containing gas at an elevated temperature above 50° C. and at a pH value of the solution at least equal to 8 and wherein the solution contains, in addition to arsenite and monothioarsenate, a concentration of arsenate in excess of three moles for each mol of thioarsenate present, and hence in excess of that required for the formation of monothioarsenate.

2. The method as claimed in claim 1, wherein the oxidizing step is effected at a superatmospheric pressure at a temperature between 50° C. and 175° C. and exceeding the boiling point of the solution under a pressure of one atmosphere.

3. The method as claimed in claim 1, wherein the absorption step is carried out at an elevated temperature between 50° C. and 150° C.

4. The method as claimed in claim 1, comprising effecting the oxidizing step in the presence of a catalyst selected from the group consisting of hydroquinone, pyrocatechin, pyrogallol, oxyhydroquinone, chlorohydroquinone, bromohydroquinone, hydroquinone-sulphonic acid, parabenzoquinone and orthobenzoquinone.

References Cited in the file of this patent
UNITED STATES PATENTS
2,772,146     Pippig _____ Nov. 27, 1956